United States Patent [19]

Babillis et al.

[11] Patent Number: 4,962,144
[45] Date of Patent: Oct. 9, 1990

[54] COMPOSITION

[75] Inventors: Robert C. Babillis, Mt. Vernon; Stanley V. Martin, Cynthiana; Randall A. Reed, Mt. Vernon, all of Ind.

[73] Assignee: General Electric Company, Mt. Vernon, Ind.

[21] Appl. No.: 292,165

[22] Filed: Dec. 30, 1988

[51] Int. Cl.$^5$ .................. C08K 5/49; C08K 5/527
[52] U.S. Cl. .................................. 524/118; 558/84
[58] Field of Search ..................... 524/118; 558/84

[56] References Cited

U.S. PATENT DOCUMENTS 3,305,520  2/1967  Fritz et al. ................... 524/151
4,409,346 10/1983  Rasberger ................... 524/117

FOREIGN PATENT DOCUMENTS 0859369  8/1981  U.S.S.R. ...................... 558/84

OTHER PUBLICATIONS

Developmental Phosphite X-398 Preliminary Data and Performance in Polypropylene.

Primary Examiner—Kriellion Morgan
Attorney, Agent, or Firm—Martin B. Barancik

[57] ABSTRACT

A composition comprising an aromatic polycarbonate in admixture with an anti-yellowing effective amount of a compound of the formula

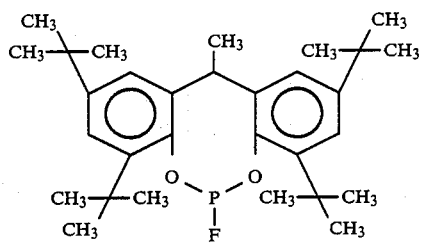

5 Claims, No Drawings

COMPOSITION

BACKGROUND OF THE INVENTION

Aromatic polycarbonates are well known thermoplastic resins. As like many other resins, polycarbonates require certain stabilizers so as to protect them from various phenomenon to which they are exposed, for example sun light, heat during processing, water vapor and the like. With respect to thermal stabilization properties, polycarbonates are known to yellow, a phenomenon related to the decomposition of the polymer chains during exposure to heat during processing. Because of its high Tg, glass transition temperature, polycarbonates must be processed at a high temperature to make them sufficiently plastic to obtain the desired shapes utilized in various applications. Typical stabilizers used over the years are phosphites and phosphonites.

Typical of the phosphites are the phosphites disclosed in Fritz U.S. Pat. No. 3,305,520. However these phosphites have been expanded to include other phosphites of far more complex structure. In fact these phosphites have been specifically included with other types of additives in polycarbonates to achieve specific desired effects. U.S. Pat. No. 4,221,728, Jaquiss, et al is one of these references. In this reference a polycarbonate is combined with a minor amount of an end blocked polyorgano hydrogen siloxane which confers antioxidant-reducing agent-thermostabilizing properties which are allegedly due to the presence of silicon bonded active hydrogen, see U.S. Pat. No. 4,221,728, incorporated by reference.

It has now been found that a non-phosphite or phosphonite phosphorus containing compound provides extremely fine thermal stabilization of polycarbonates, particularly those with low intrinsic viscosity as measured by Yellowness Index, Y.I. Very good hydrolytic stability as measured in the conventional testing systems is also expected. The stabilizer in the invention obtains these excellent results while substantially maintaining significant properties of the aromatic polycarbonate.

SUMMARY OF THE INVENTION

In accordance with the invention there is a composition which comprises an aromatic polycarbonate polymer in admixture with an anti-yellowing effective amount of a compound of the formula

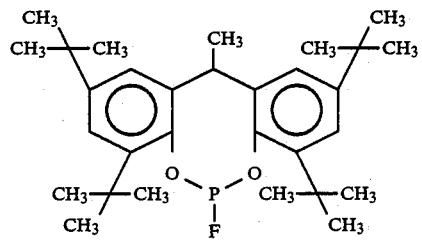

DETAILED DESCRIPTION OF THE INVENTION

The aromatic polycarbonates suitable for use herein readily prepared by reacting a dihydric phenol with a carbonate precursor, such as phosgene, a haloformate or a carbonate ester. Typically, such carbonate polymers are represented as comprising recurring structural units of the formula:

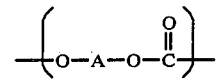

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.20 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:

2,2-bis-(4-hydroxyphenyl)propane;
hydroquinone;
resorcinol;
2,2-bis-(4-hydroxyphenyl)pentane;
biphenol;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-dimethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4'4'-dihydroxydiphenyl ether;
4,4'-dihydroxy-3,3'-dichlorodiphenyl ether;
4,4'-dihydroxy-2,5-dimethylphenyl ether;
and the like.

Other dihydric phenols which are also suitable for use in the preparation of the above polycarbonates are disclosed in U.S. Pat. Nos. 2,999,835; 3,038,365; 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,426, or by transesterification processes such as are disclosed in U.S. Pat. No. 3,153,008, as well as other processes known to those skilled in the art.

Branched polycarbonates are also useful, such as are described in U.S. Pat. No. 4,001,184. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a) herein is a homopolymer derived from 2,2-bis(4-hydroxyphenyl)propane (bisphenol-A).

Bisphenol-A polycarbonates suitable for use in optical grades such as compact discs are particularly preferred. Intrinsic viscosities of about 0.35 to about 0.41 dl/g encompass polycarbonates used in these applications. The intrinsic viscosity is measured at 25° C. in methylene chloride.

The phosphorous containing compound utilized in this invention has an empirical formula of $C_{30}H_{44}PO_2F$. It is available from Ethyl Corporation. It is generally in the form of a white crystalline powder of molecular weight 486. It has a phosphorous content of 6.4 wt. percent and a melting point of 200°–201° C. It is quite stable and does not appear to have any appreciable toxicity or handling problems which would inhibit its use with polycarbonate. The phorphorous containing stabilizer of the invention shows an initially lower Y.I. when combined with polycarbonate under ordinary molding conditions than a standard phosphite and phosphonite. Further it generally has a small delta Y.I. when molded at abusive conditions when compared to standard conditions with respect to both the phosphite and phosphonite.

The compositions of the invention are prepared simply by mixing the compound of the invention and the aromatic polycarbonate together as in a Brabender mixture and then extruding into a filament which can be chopped into a pellet. The usual applications for which aromatic polycarbonates are useful are applicable here as well.

An anti-yellowing effective amount of the compound is admixed with the polycarbonate. Generally this is from about 0.01 to about 0.5 pph of polycarbonate, preferably from about 0.03 to about 0.3 pph.

Extrusion and molding temperatures are the typical ones employed for polycarbonate.

The instant compositions may also optionally contain certain commonly known and used additives such as, for example, flame retardants, antioxidants-antistatic agents, fillers such as glass fibers, glass beads, talc, mica, clay, and the like; mold release agents; ultraviolet radiation absorbers such as the benzophenones, benzotriazoles, benzylidene malonates, and the like. Below are the examples. These examples are intended to illustrate the scope of the invention rather than narrow its inventive scope.

In the examples below a bisphenol-A polycarbonate having an intrinsic viscosity at 25° C. in methylene chloride when the preferred range of 0.35 to 0.41 was combined with various quantities of certain phosphorous containing compounds.

The phosphite designated as "A" is tris(2,4-ditert-butylphenyl)phosphite.

The phosphonite designated as "B" is tris(tetrakis [2,4-dit-tert butylphenyl]4,4'-bisphenylenediphosphonite). Although the results with B are included to be complete, it must be noted that this phosphonite is no longer employed with polycarbonate in a commercial manner by assignee because of allegations of adverse health implications.

The phosphorous containing compound designated "C" is the compound of the invention.

EXAMPLE I

EXAMPLE I

| Stabilizer | Level (pph) | 550° F. Y.I. | 680° F. Y.I. | Delta Y.I. (680–550° F. Y.I.) |
|---|---|---|---|---|
| Experiment 1 | | | | |
| Control | — | 1.8 | 2.0 | 0.2 |
| A | .03 | 1.7 | 2.9 | 1.2 |
| A | 0.1 | 1.7 | 2.5 | 0.8 |
| B | .03 | 1.8 | 2.2 | 0.4 |
| B | 0.1 | 1.4 | 1.9 | 0.5 |
| C | .03 | 1.5 | 1.6 | 0.1 |
| C | 0.1 | 1.5 | 1.8 | 0.3 |
| Experiment 2 | | | | |
| Control | — | 1.7 | 1.8 | 0.1 |
| A | .05 | 1.4 | 1.5 | 0.1 |
| A | 0.1 | 1.4 | 1.4 | 0 |
| B | .05 | 1.3 | 1.3 | 0 |
| B | 0.1 | 1.2 | 1.3 | 0.1 |
| C | .05 | 1.4 | 1.5 | 0.1 |
| C | 0.10 | 1.2 | 1.4 | 0.2 |
| Experiment 3 | | | | |
| A | .045 | 1.8 | 1.8 | 0 |
| B | .045 | 1.0 | 1.1 | 0.1 |
| C | .045 | 1.0 | 1.1 | 0.1 |

As is observed, the compound of the invention has lower initial Y.I. at ordinary molding conditions and generally provide a smaller Delta Y.I. spread at abusive molding conditions.

What is claimed is:

1. A composition comprising an aromatic polycarbonate in admixture with an anti-yellowing effective amount of a compound of the formula

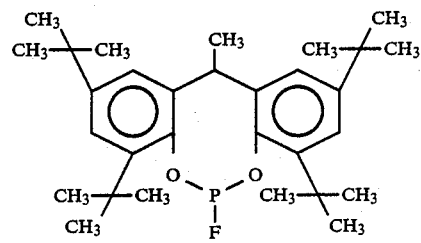

2. The claim in accordance with claim 1 wherein the aromatic polycarbonate is a bisphenol-A polycarbonate.

3. The claim in accordance with claim 2 wherein the intrinsic viscosity of the polycarbonate is from about 0.35 to about 0.41 dl/g as measured in methylene chloride at 25° C.

4. The claim in accordance with claim 3 wherein the level of compound is from about 0.01 to about 0.5 pph of the polycarbonate.

5. The claim in accordance with claim 4 wherein the level is from about 0.03 to about 0.3 pph.

* * * * *

REEXAMINATION CERTIFICATE (3469th)

United States Patent [19]
Babillis et al.

[11] B1 4,962,144
[45] Certificate Issued Mar. 24, 1998

[54] COMPOSITION

[75] Inventors: Robert C. Babillis, Mt. Vernon; Stanley V. Martin, Cynthiana; Randall A. Reed, Mt. Vernon, all of Ind.

[73] Assignee: General Electric Co., Mt. Vernon, Ind.

Reexamination Request:
No. 90/003,243, Nov. 3, 1993

Reexamination Certificate for:
Patent No.: 4,962,144
Issued: Oct. 9, 1990
Appl. No.: 292,165
Filed: Dec. 30, 1988

[51] Int. Cl.$^6$ .............................. C08K 5/49; C08K 5/527
[52] U.S. Cl. .............................. 524/118; 558/84
[58] Field of Search .............................. 524/118; 558/84

[56] References Cited

U.S. PATENT DOCUMENTS 4,912,155  3/1990  Burton ........................... 524/118

FOREIGN PATENT DOCUMENTS 0377103  7/1990  European Pat. Off. .

OTHER PUBLICATIONS

"Developmental Phosphite X–398 Preliminary Data and Performance in Polypropylene", The General Electric Corporation, Mar. 6, 1987, pp. 1–13.

*Primary Examiner*—Kriellion A. Sanders

[57] ABSTRACT

A composition comprising an aromatic polycarbonate in admixture with an anti-yellowing effective amount of a compound of the formula

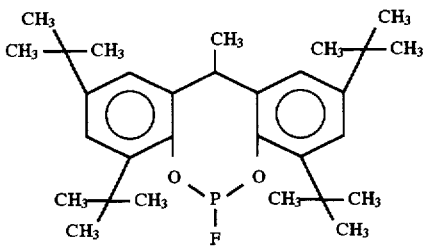

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–5 are cancelled.

* * * * *